United States Patent
Kaplan et al.

(10) Patent No.: US 11,168,238 B2
(45) Date of Patent: Nov. 9, 2021

(54) LOW VOC POLYURETHANE ADHESIVE

(71) Applicant: Stepan Company, Northfield, IL (US)

(72) Inventors: Warren A. Kaplan, Libertyville, IL (US); Sarah Wolek, Arlington Heights, IL (US)

(73) Assignee: Stepan Company, Northfield, IL (US)

(*) Notice: Subject to any disclaimer, the term of this patent is extended or adjusted under 35 U.S.C. 154(b) by 37 days.

(21) Appl. No.: 16/579,301

(22) Filed: Sep. 23, 2019

(65) Prior Publication Data

US 2020/0017736 A1 Jan. 16, 2020

Related U.S. Application Data

(63) Continuation of application No. PCT/US2018/026680, filed on Apr. 9, 2018.

(60) Provisional application No. 62/483,531, filed on Apr. 10, 2017.

(51) Int. Cl.

| | | |
|---|---|---|
| *C09J 175/04* | (2006.01) | |
| *C08G 18/42* | (2006.01) | |
| *C08G 18/20* | (2006.01) | |
| *C08G 18/32* | (2006.01) | |
| *C08G 18/66* | (2006.01) | |
| *E04D 5/14* | (2006.01) | |
| *C08G 18/76* | (2006.01) | |
| *C08K 5/1565* | (2006.01) | |

(52) U.S. Cl.
CPC ........ *C09J 175/04* (2013.01); *C08G 18/2063* (2013.01); *C08G 18/3206* (2013.01); *C08G 18/4244* (2013.01); *C08G 18/6607* (2013.01); *C08G 18/7664* (2013.01); *E04D 5/148* (2013.01); *C08K 5/1565* (2013.01)

(58) Field of Classification Search
CPC ...... C09J 175/04; C08K 5/1565; E04D 5/148; C08G 18/4244; C08G 18/2063; C08G 18/6607; C08G 18/7664; C08G 18/3206
See application file for complete search history.

(56) References Cited

U.S. PATENT DOCUMENTS

| | | | |
|---|---|---|---|
| 3,102,825 A * | 9/1963 | Rogers, Jr. .......... | C08J 9/40 521/55 |
| 4,412,033 A | 10/1983 | LaBelle et al. | |
| 5,354,807 A | 10/1994 | Dochniak | |
| 5,506,328 A | 4/1996 | Chandalia et al. | |
| 5,536,805 A | 7/1996 | Kangas | |
| 5,849,133 A | 12/1998 | Senderling et al. | |
| 5,872,203 A | 2/1999 | Wen et al. | |
| 5,998,538 A * | 12/1999 | Meckel .......... | C08G 18/10 524/539 |
| 7,622,187 B2 | 11/2009 | Clarke et al. | |
| 2014/0044935 A1 | 2/2014 | Miller | |
| 2015/0105517 A1 | 4/2015 | Baukema et al. | |
| 2018/0010024 A1* | 1/2018 | Lu .................. | C08G 18/4211 |
| 2018/0291163 A1 | 10/2018 | Schneider et al. | |
| 2019/0185717 A1 | 6/2019 | Cotsakis et al. | |

FOREIGN PATENT DOCUMENTS

| | | |
|---|---|---|
| WO | 2018191075 | 10/2018 |
| WO | 2018191107 | 10/2018 |

OTHER PUBLICATIONS

International Searching Authority, "Internationa Search Report and Written Opinion," issued in connection with International Patent Application No. PCT/US2018/026680, dated Jun. 11, 2018, 13 pages.
European Extended Search Report, European Patent Application No. 18784482.4, dated Dec. 17, 2020, 5 pages.

* cited by examiner

*Primary Examiner* — Robert D Harlan
(74) *Attorney, Agent, or Firm* — McAndrews, Held & Malloy, Ltd.

(57) ABSTRACT

A low-VOC, two-component polyurethane adhesive is provided. The polyurethane adhesive has an A-side that includes an isocyanate and a non-reactive plasticizer, and a B-side that includes an aliphatic polyester polyol, a non-polyester polyol, and a urethane catalyst. The A-side and the B-side are reacted at a volume ratio of 1:1 and formulated at an NCO/OH index within the range of 0.90 to 1.10. The polyurethane adhesive is solvent-free and is particularly suitable for adhering a polymeric membrane to a substrate.

12 Claims, No Drawings

LOW VOC POLYURETHANE ADHESIVE

CROSS-REFERENCE TO RELATED APPLICATIONS

This application is a continuation of and claims priority to PCT application No. PCT/US2018/026680, filed Apr. 9, 2018, which claims priority to United States Provisional Application No. 62/483,531, filed Apr. 10, 2017. The entire specification of the PCT and provisional applications referred to above are hereby incorporated by reference.

BACKGROUND OF THE INVENTION

The present technology relates to a solvent-free low-VOC polyurethane adhesive, and more specifically, to a two-part polyurethane adhesive. The polyurethane adhesive is particularly useful for adhering polymeric roofing membranes to roof substrates.

Membrane roofing is a type of roofing system that is often used on flat or low slope roofs to prevent leaks and move water off the roof. The system typically comprises a polymeric membrane that is fastened to the roof deck substrate with mechanical fasteners, heat, or adhesives. The polymeric roofing membranes can be prepared from different polymeric materials, such as ethylene propylene diene monomer rubber (EPDM), thermoplastic olefin (TPO), and polyvinyl chloride (PVC). The roofing membranes are customarily prepared in wide sheets that are bonded together at the seams to form one continuous membrane that is impervious to water.

A variety of different adhesives have been used to adhere the roofing membrane to the roof deck substrate. Many of these adhesives contain a large amount of solvents, such as toluene, xylene, or other aromatic hydrocarbons, which are undesirable from an environmental standpoint. Moreover, stricter regulations limiting volatile organic compounds (VOCs) have been proposed, making it important to limit or eliminate solvents from roofing adhesive compositions.

Other adhesive compositions that have been used to adhere roofing membranes contain various adhesion promoters, for example those containing halogens, such as chlorinated waxes, chlorinated paraffins, or chlorinated polyolefins, or those containing silanes. Formulating an adhesive composition that does not require an adhesion promoter to obtain acceptable adhesive properties provides certain advantages, such as lower cost, and ease of preparation. In addition, an adhesive composition that does not require halogenated adhesion promoters is more environmentally friendly.

Although solvent-free and water-based adhesives have been developed, there is still a need for a solvent-free, low VOC adhesive that can be easily applied using standard mixing or spraying equipment, can provide controllable cure rates, and can provide good bond strength without the need for adhesion promoters.

SUMMARY OF THE INVENTION

In one aspect, this disclosure provides a non-foaming, low-VOC two-component polyurethane adhesive comprising a reaction product of (a) a "B side" comprising from about 5 wt % to about 20 wt % non-polyester polyol, from about 80 wt % to about 95 wt % aliphatic polyester polyol having a hydroxyl number within the range of 150 to 300 mg KOH/g and an average hydroxyl functionality of about 1.8 to about 2.2, and less than 1 wt % catalyst, based on the weight of the B-side components; and (b) an "A side" comprising from about 80 wt % to about 92 wt % of at least one polyisocyanate, and from about 8 wt % to about 20 wt % of a non-reactive plasticizer; wherein the "B side" and "A side" are reacted at a volume ratio of about 1:1, and the adhesive is formulated at an NCO/OH index within the range of 0.90 to 1.10.

In a further aspect, this disclosure provides a method for preparing a non-foaming, low-VOC two-component polyurethane adhesive by combining, under suitable reaction conditions, an "A side" comprising a polymeric isocyanate and a non-reactive plasticizer, and a "B side" comprising an aliphatic polyester polyol having a hydroxyl number within the range of 150 to 300 mg KOH/g and an average hydroxyl functionality of about 1.8 to about 2.2, and ethylene glycol, in the presence of a urethane catalyst, wherein the polyurethane adhesive is formulated at a ratio of NCO to OH groups of 0.90 to 1.10, and the "A side" and the "B side" are reacted at a volume ratio of about 1:1.

DETAILED DESCRIPTION OF THE PREFERRED EMBODIMENTS

The adhesive composition of the present technology is a two-part polyurethane composition that combines an isocyanate-containing portion or "A-side" with an isocyanate-reactive portion or a "B-side" at the point of application. Advantageously, the two portions can be easily combined using, for example, conventional mixing or spraying equipment to prepare the polyurethane adhesive.

The isocyanate-reactive "B-side" comprises an aliphatic polyester polyol, a non-polyester polyol, and a urethane catalyst. By "non-polyester polyol" is meant a polyol that does not have an ester moiety. The aliphatic polyester polyol is the reaction product of an aliphatic dicarboxylic acid, or an anhydride or lactone derivative thereof, reacted with an excess of hydroxyl-containing material. Suitable aliphatic dicarboxylic acids for use herein include succinic acid, fumaric acid, maleic acid, adipic acid, oxalic acid, glutaric acid, azelaic acid, sebacic acid, dimer acids, and mixtures thereof. Suitable hydroxyl-containing materials comprise ethylene glycol, propylene glycol, 1,3-butanediol, 1,4-butanediol, 1,5-pentanediol, 1,6-hexanediol, 2-methyl-1,3-propanediol, neopentyl glycol, diethylene glycol, dipropylene glycol, triethylene glycol, 1,3-propane glycol, pentaerythritol, glycerol, diglycerol, trimethylol propane, cyclohexanediol, sorbitol, sugars such as sucrose, and other low-molecular weight polyols, such as polyethylene glycols having a molecular weight of about 400 g/mol or less, and combinations of any of the foregoing hydroxyl-containing materials. In some embodiments, the aliphatic polyester polyol is derived from adipic acid reacted with diethylene glycol.

The aliphatic polyester polyol contains an amount of aliphatic dicarboxylic acid or derivative thereof relative to the amount of hydroxyl-containing material to give an average hydroxyl value of about 150 to about 300 mg KOH/g, alternatively about 200 to about 250 mg KOH/g. The aliphatic polyester polyol also has an acid value of less than 2, such as an acid value of about 0.05 to about 1.8, alternatively about 0.10 to about 1.5, alternatively about 0.20 to about 1.0, alternatively about 0.5 to about 1.0, and an average functionality of about 2, such as a functionality in the range of 1.8 to 3.0, alternatively 1.8 to about 2.5, alternatively 1.8 to about 2.2. The aliphatic polyester polyol comprises from about 80% to about 95% by weight of the total B-side portion.

The non-polyester polyol component is a polyol, such as a diol or a triol, or mixtures thereof, having a low molecular weight, such as a molecular weight of about 400 g/mol or less, and an OH value in the range of about 280 to about 1830. Suitable non-polyester polyols for use herein include ethylene glycol, diethylene glycol, glycerin, triethylene glycol, 1,3-butanediol, 1,4-butanediol, 1,3-propanediol, 1,5-pentanediol, 1,6-hexanediol, 2-methyl-1,3-propanediol, propylene glycol, dipropylene glycol, and mixtures thereof. The non-polyester polyol has a functionality of not higher than 3, preferably about 2. In some embodiments, the non-polyester polyol contains primary hydroxyl groups. In some embodiments, the non-polyester polyol is ethylene glycol. The non-polyester polyol comprises from about 5% to about 20% by weight of the total B-side portion.

The catalyst is a suitable urethane catalyst, including tertiary amine compounds, amines with isocyanate reactive groups, and organometallic compounds. Exemplary organometallic catalysts include organomercury, organolead, organoferric and organotin catalysts. Other suitable catalysts include one or more members selected from the group consisting of (a) metal catalysts, such as an alkali metal alkoxide, such as potassium octoate, stannous octoate, or stannous chloride, or tin salts of carboxylic acids, such as dibutyltin dilaurate or bismuth neodecanoate, and (b) amine compounds, such as triethylenediamine (TEDA), N-methylimidazole, 1,2-dimethylimidazole, N-methylmorpholine, N-ethylmorpholine, trimethylamine, triethylamine, N,N'-dimethylpiperazine, 1,3,5-tris(dimethylaminopropyl)hexahydrotriazine, 2,4,6-tris(dimethylaminomethyl)phenol, N-methyldicyclohexylamine, N,N-dimethylcyclohexylamine, tetramethylethylenediamine, N-methyl-N'-(2-dimethylamino)-ethyl-piperazine, tributylamine, pentamethyldiethylenetriamine, hexamethyltriethylenetetramine, heptamethyltetraethylenepentamine, pentamethyldipropylenetriamine, triethanolamine, dimethylethanolamine, bis(dimethylaminoethyl)ether, tris(3-dimethylamino)propylamine, 1,8-diazabicyclo[5.4.0]undecene, bis(N,N-dimethylaminopropyl)-N'-methyl amine, 1-methyl-4-dimethylaminoethylpiperazine, 3-methoxy-N-dimethylpropylamine, N-ethylmorpholine, N-cocomorpholine (CAS No. 72906-09-3, a product of BASF SE, Ludwigshafen, Germany), N,N-dimethyl-N',N'-dimethyl isopropylpropylenediamine, N,N-diethyl-3-diethylamino-propylamine, diethylethanolamine, 3-methoxypropyldimethylamine, N,N,N'-trimethylisopropyl propylenediamine, 3-diethylaminopropyl-diethylamine, and dimethylbenzylamine, as well as any mixture thereof. The amount of catalysts can vary from greater than 0 to about 1% by weight of the total B-side components, such as about 0.05 to about 1% by weight, or about 0.1 to about 1% by weight of the total B-side components.

The B-side may optionally contain additional polyester polyols, such as aromatic polyester polyols that are the reaction product of phthalic acid, isophthalic acid, terephthalic acid or phthalic anhydride reacted with an excess of diol or triol (for example, any of the diols or triols noted above). Because aromatic polyester polyols can reduce the flexibility and elongation of the polyurethane adhesives, if such additional polyester polyols are present, they must be present in an amount that does not adversely affect the elongation properties desired. In general, when additional polyester polyols are present, the overall functionality of the polyester polyol component is in the range of 1.8 to 2.2, based on the molar ratio of the polyester polyols in the polyester polyol component.

The B-side portion, comprising the aliphatic polyester polyol and the non-polyester polyol, has an overall OH value of at least 250 mg KOH/g, such as an OH value in the range of about 250 to about 500 mg KOH/g. The B-side portion also has an overall viscosity of less than about 1,000 cps at 25° C. using a Brookfield viscometer with a #3 spindle. In some embodiments, the B-side portion has a viscosity of less than 800 cps, alternatively less than 700 cps, alternatively less than 600 cps, alternatively less than 500 cps, alternatively less than 400 cps at 25° C., but greater than zero. In some embodiments, the viscosity of the B-side is at least 50 cps, alternatively at least 100 cps, alternatively at least 200 cps, alternatively at least 300 cps at 25° C.

The B-side portion can also contain optional additives. For example, the additives can include one or more of surfactants, flame retardants, pigments, defoaming agents, drying agents, and plasticizers, or any combination thereof. Although additives are typically incorporated into the B-side portion, it is understood that they could also be incorporated into the A-side portion when the additive is compatible with the isocyanate compound.

The isocyanate-containing "A-side" comprises an isocyanate component, preferably a polyisocyanate component. A polyisocyanate is herein defined as having two or more isocyanate functionalities. Examples of suitable polyisocyanates include conventional aliphatic, cycloaliphatic, and aromatic isocyanates or mixtures thereof, having a nominal functionality in the range of about 2.25 to about 3. Specific examples include: alkylene diisocyanates with 4 to 12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and 1,6-hexamethylene diisocyanate; cycloaliphatic diisocyanates such as 1,3- and 1,4-cyclohexane diisocyanate, as well as any mixtures of these isomers, 1-isocyanato-3,3,5-trimethyl-5-isocyanatomethyl-cyclohexane (isophorone diisocyanate), 2,4- and 2,6-hexahydrotoluene diisocyanate and the corresponding isomeric mixtures, 4,4'-2,2'- and 2,4'-dicyclohexylmethane diisocyanate as well as the corresponding isomeric mixtures, and aromatic diisocyanates and polyisocyanates such as 2,4- and 2,6-toluene diisocyanate and the corresponding isomeric mixtures, and 2,2'-diphenylmethane diisocyanate and the corresponding isomeric mixtures, mixtures of 4,4'-, 2,4'-, and 2,2-diphenylmethane diisocyanates and polyphenylene polymethylene polyisocyanates (crude MDI).

In one embodiment, the polyisocyanate component used in the A-side portion is a polymeric diphenylmethane diisocyanate (MDI) having a nominal functionality of approximately 2.7-3.0, and an NCO content of approximately 31.5 weight percent.

The isocyanate-containing A-side also comprises at least one plasticizer that is non-reactive with the components in the A-side and B-side portions. In general, suitable plasticizers are those that have no isocyanate reactive groups, have a high boiling temperature, such as 100° C. or greater, and have a low viscosity of about 75 cps or less at 25° C. Specific examples of plasticizers for use herein include propylene carbonate, TXIB™, available from Eastman, Kingsport, Tenn., DBE® esters, which are various mixtures of dimethyl succinate, dimethyl glutarate, and dimethyl adipate, commercially available from Invista, Wichita, Kans., methyl esters of carboxylic acids, including methyl esters of fatty acids, triethyl phosphate, tris-isopropylchlorophosphate (TCPP), and other non-reactive phosphate esters, and mixtures of any of the foregoing.

The amount of isocyanate and plasticizer present in the A-side depends in part on the OH value of the B-side. In general, the higher the OH value of the B-side, the more plasticizer that should be present in the A-side. A suitable amount of isocyanate is in the range of about 80% to about 92% by weight of the A-side components, and a suitable amount of plasticizer is in the range of about 8% to 20% by weight of the A-side components. In one embodiment, the A-side comprises about 85% to about 90% polyisocyanate and about 10% to about 15% propylene carbonate plasticizer. The A-side has an overall viscosity of about 200 cps or less, alternatively 150 cps or less, alternatively 100 cps or less, measured at 25° C. using a Brookfield viscometer with a #3 spindle.

The adhesive composition of the present technology is prepared by combining the A-side and the B-side at a volume ratio of about 1:1 and at an NCO/OH index within the range of about 0.90 to about 1.10. Preferably, the A-side and the B-side are packaged separately and then combined by mixing the portions together prior to application on a substrate.

The A-side and B-side portions can be packaged and mixed in a variety of ways. For example, they can be packaged in separate containers or buckets and mixed by hand or by using standard static mixing equipment. Alternatively, they can be packaged in separate tubes or cartridges and combined using dual cartridge caulk guns. Advantageously, the A-side and B-side are sprayable and can be combined by using standard spray equipment, such as a Graco "Reactor H-30" high pressure plural component sprayer or similar equipment. The spray equipment can be operated using conventional settings, such as block temperatures in the range of about 100 to about 140° F. and pressures in the range of about 700 psi to about 1,200 psi during spraying.

The adhesive composition of the present technology is free of solvents or solvent-free. "Solvent-free" means that the A-side and the B-side and the final polyurethane adhesive contain less than about 1 wt % of solvent, or less than about 0.5 wt % solvent, or less than about 0.1 wt % solvent, or less than 0.01 wt % solvent, or contain no solvent (have 0 wt % solvent). "Solvent" as used herein means a bulk solubilizing material, typically present in excess in a solution, which volatilizes during curing of the adhesive. The polyurethane adhesive also has a low amount of volatile organic compounds (VOCs). By "low amount" or "low VOC" is meant that the final polyurethane adhesive has less than 250 g/liter, or less than 150 g/liter, or less than 125 g/liter of volatile material detected, using standard ASTM test methodologies. The adhesive composition is also non-foaming. By "non-foaming" is meant that the A-side and B-side do not contain any intentionally added reactive or non-reactive blowing agents, including water, that produce a cellular structure within the adhesive. Ambient or atmospheric moisture is not considered a blowing agent.

During mixing and after mixing, the A-side and B-side react to form a polyurethane adhesive having several advantageous properties. In particular, the polyurethane adhesive has an elongation of about 200% or greater, and provides a peel strength of greater than about 1 lb. per linear inch when adhering a polymeric membrane to a substrate. Elongation is measured on an Instron Apparatus using a 0.5 inch wide by 0.1 inch thick dog-bone shape sample pulled in tensile mode at 2.0 inches/min.

The polyurethane adhesive of the present technology is particularly suitable in roofing applications for adhering a polymeric membrane to a roofing substrate. The polyurethane adhesive provides the desired adhesive strength without the need to employ primers or use a treated membrane, such as one that incorporates a "fleece" backing or has a roughened surface. In some embodiments, the polyurethane adhesive exhibits a wind uplift rating of 120 pounds per square foot for an EPDM membrane adhered directly to a roof substrate without the use of a primer or treated membrane. The polyurethane adhesive also has an "open time" of optimally at least a minute up to about 30 minutes, depending on the amount of catalyst employed. "Open time" means the time after combining the A-side and the B-side until the mixture starts to become too viscous to embed a membrane into the reacting adhesive. Having an open time of at least several minutes is advantageous in roofing applications, since it allows for adjustment of the membrane on the roofing substrate.

The presently described technology and its advantages will be better understood by reference to the following examples. These examples are provided to describe specific embodiments of the present technology. By providing these examples, the inventors do not limit the scope and spirit of the present technology.

"About" as used herein means +/−5% of the referenced value or less. In certain embodiments, about means +/−4% of the referenced value, or +/−3% of the referenced value, or +/−3% of the referenced value, or +/−2% of the referenced value, or +/−1% of the referenced value.

The following test methods are used to determine properties of the A-side and the B-side, and the polyurethane adhesive composition:

Mechanical Testing

Mechanical property testing is performed on a Universal Testing Machine (MTS Renew® System), and collection and analysis is performed using Testworks® 4.11 software. The central, test portion of the dog bone sample is 0.5 inches wide and 1.65 inches in length. The polymeric dog bone is placed within pneumatic grips spaced at 2.25 inches. A 1000 lb. load cell is used to measure mechanical properties at a tensile pull rate of 2 in./min. until sample breakage. Tensile strength, modulus, elongation-at-break and total energy absorbed are measured in duplicate and averaged. If a sample is determined to have prematurely broken due to an imperfection or bubble within the testing area, a third sample is measured.

Adhesion Testing

Adhesion strength testing is performed using a modified version of ASTM D429 Method B. Adhesion samples are prepared by applying about 4.0 to about 4.5 g of adhesive to a plywood substrate that is 0.5 inches thick, 3.2 inches wide, and 6 inches long and adhering an EPDM rubber membrane that is 0.06 inches thick, 2.25 inches wide, and at least 6 inches long to the plywood substrate. A 6.5 lb. weight is placed across the top of the adhering sample, and the assembly is allowed to cure for at least 1 hour prior to weight removal. Excess adhesive extending beyond the perimeter of the membrane during the cure process is cut away from the membrane edge prior to adhesion testing.

Adhesion strength testing is performed using an Instron Testing Machine equipped with a 50 lb. load cell and standard tensile test grips (2.25 inches wide). Each membrane-to-substrate sample tested is "pulled" 3 times to 1.25 inches of extension (@ 5 inches/minute), and the data (Peak Load, Peak Force, Average Load and Peel Strength) for the 3 pulls are recorded and averaged for each sample.

Peak Load (expressed in lb.-force) is the maximum stress encountered during the 1.25 inch peeling event. Peak Force is the Peak Load normalized by the sample width and is expressed as lb.-force/inch. Average Load is an average of the force required to delaminate between 0.25 inches to 1.25 inches of extension. Peel Strength is the average delamination force (from 0.25 inches to 1.25 inches), normalized for sample width. Peel strength is expressed as lb.-force/inch and three values are averaged per sample.

Viscosity

Test samples are conditioned to 25° C. (+/−0.2° C.) and viscosity measurements are performed using a standard Brookfield Rotational Viscometer equipped with a #3 spindle and appropriate revolution speed.

The following components were used in the following examples:

Polyester Polyol 1: adipic acid based polyol with nominal OHV of 225 mg KOH/g and nominal functionality of 2.0.

Ethylene Glycol: nominal OHV of 1810 and nominal functionality of 2.0.

Dabco® 33LV: tertiary amine catalyst from Air Products and Chemicals, Inc.

Lupranate® M-20: polymeric Diphenylmethane-4-4'-diisocyanate with nominal functionality of 2.7 available from BASF.

EXAMPLE 1

The B-side portion was made by blending about 90% by weight of Polyester Polyol 1 with about 10% by weight Ethylene Glycol, and 0.16% by weight catalyst. The resulting B-side portion had a viscosity of 320 cps at 25° C.

The A-side portion was made by blending 87.5% by weight polymeric isocyanate and 12.5% by weight propylene carbonate. The resulting A-side portion had a viscosity of 90 cps at 25° C.

Polyurethane adhesive was produced by hand mixing and reacting the B-side portion and the A-side portion at a 1:1 ratio by volume and at an NCO/OH index of about 1. The hand mix reaction (100 g total mix) at 77° F. component temperatures results in a string/gel time of 4 min. 30 sec. to 4 min. 45 sec. Elongation of the adhesive is 287% (elongation at break). The peel strength of an untreated EPDM membrane adhered to wood using the polyurethane adhesive is about 1.0 lbf/in.

The present technology is now described in such full, clear and concise terms as to enable a person skilled in the art to which it pertains, to practice the same. It is to be understood that the foregoing describes preferred embodiments of the present technology and that modifications may be made therein without departing from the spirit or scope of the present technology as set forth in the appended claims. Further, the examples are provided to not be exhaustive but illustrative of several embodiments that fall within the scope of the claims.

The invention claimed is:

1. A non-foaming, low-VOC two-part polyurethane adhesive comprising a reaction product of (a) an isocyanate-reactive portion comprising (i) from about 5 wt % to about 20 wt % non-polyester polyol; (ii) from about 80 wt % to about 95 wt % aliphatic polyester polyol having a hydroxyl number within the range of 150 to 300 mg KOH/g and an average hydroxyl functionality of about 1.8 to 2.2; and (iii) less than 1 wt % catalyst, based on the weight of the isocyanate-reactive portion components; and (b) an isocyanate-containing portion comprising (i) from about 80 wt % to about 92 wt % of at least one polyisocyanate, and (ii) from about 8 wt % to about 20 wt % of a non-reactive plasticizer based on the weight of the isocyanate-containing portion components; wherein the isocyanate-reactive portion and the isocyanate-containing portion are reacted at a volume ratio of about 1:1, and the adhesive is formulated at an NCO/OH index within the range of 0.90 to 1.10, wherein the adhesive has a VOC content of less than 250 g/L.

2. The polyurethane adhesive of claim 1, wherein the non-polyester polyol is selected from the group consisting of ethylene glycol, diethylene glycol, triethylene glycol, glycerin, 1,3-propanediol, 1,5-pentanediol, 1,4-butanediol, 1,3-butanediol, 1,6-hexanediol, 2-methyl-1,3-propanediol, propylene glycol, dipropylene glycol, and mixtures thereof.

3. The polyurethane adhesive of claim 1, wherein the aliphatic polyester polyol is an adipate polyester polyol.

4. The polyurethane adhesive of claim 1, wherein the aliphatic polyester polyol has an Acid Value of less than 2.

5. The polyurethane adhesive of claim 1, wherein the non-polyester polyol has a functionality of less than 3.

6. The polyurethane adhesive of claim 1, wherein the isocyanate-reactive portion has an overall OH value of about 250 to about 500 mg KOH/g.

7. The polyurethane adhesive of claim 1, wherein the isocyanate-reactive portion has a viscosity of less than 1,000 cps.

8. The polyurethane adhesive of claim 1, wherein the non-reactive plasticizer comprises propylene carbonate.

9. The polyurethane adhesive of claim 1, wherein the adhesive is solvent-free.

10. The polyurethane adhesive of claim 1, wherein the adhesive has adhesive properties sufficient to bond a polymeric material to a substrate.

11. The polyurethane adhesive of claim 10, wherein the polymeric material is a polymeric roofing membrane.

12. The polyurethane adhesive of claim 1, wherein the polyurethane adhesive has an elongation of about 200% or greater.

* * * * *